United States Patent Office 3,702,706
Patented Nov. 14, 1972

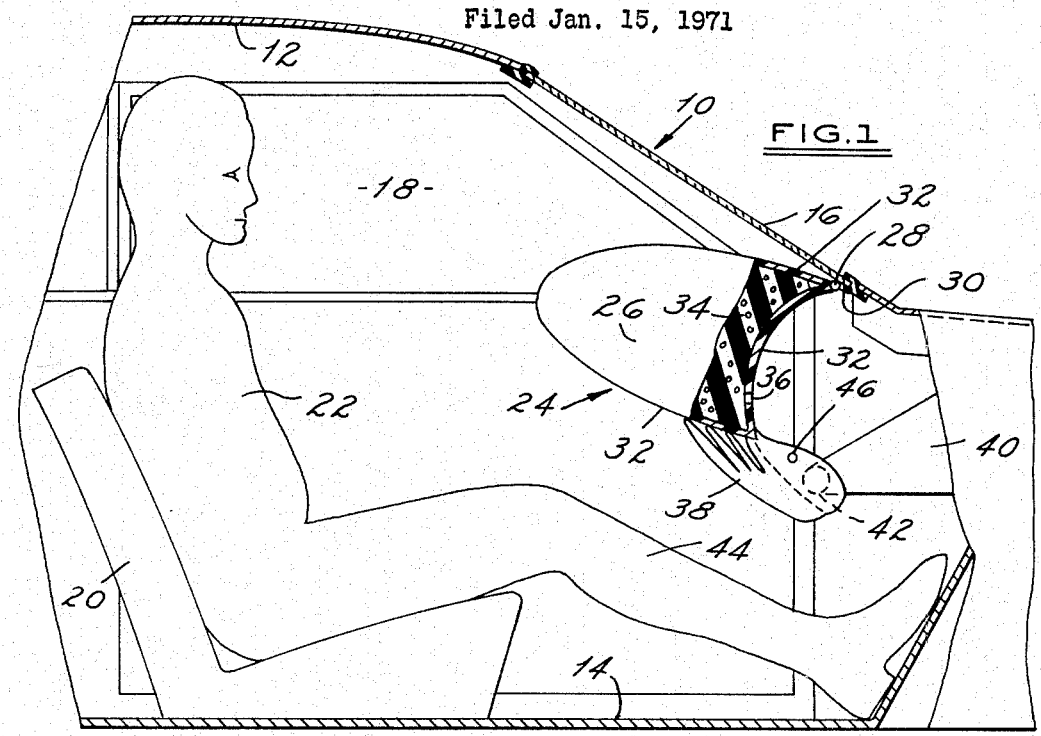
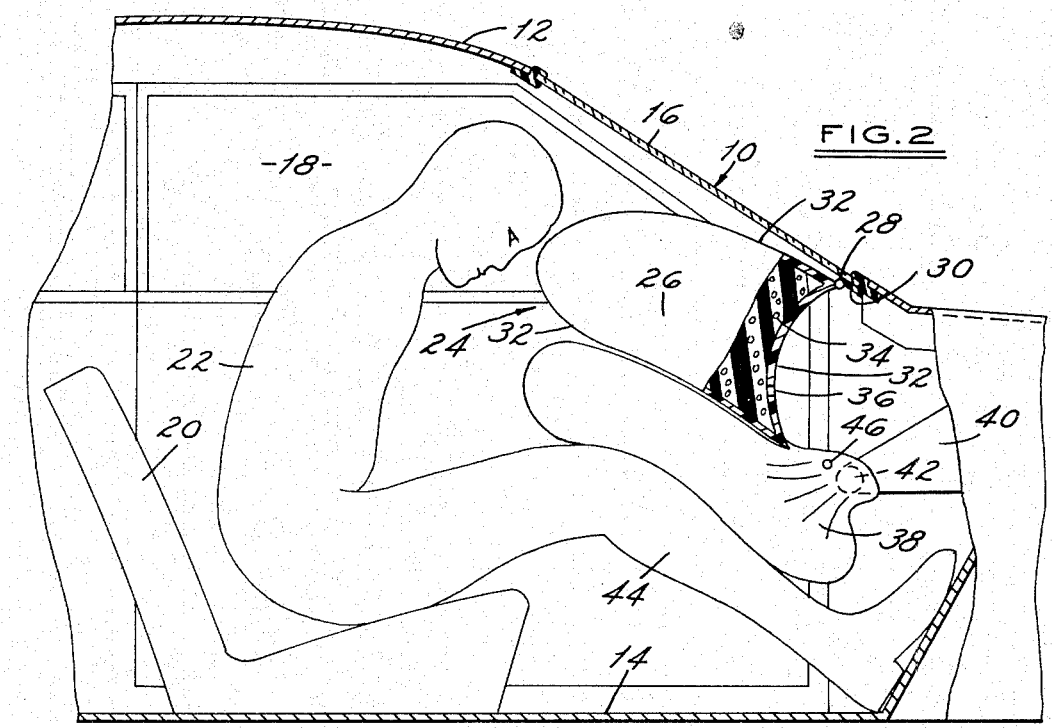
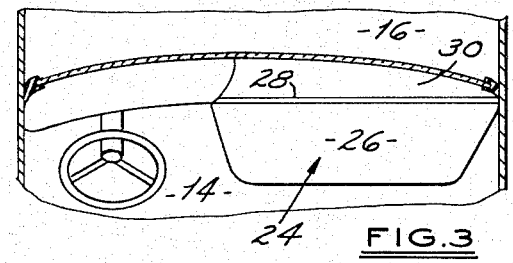

3,702,706
MOTOR VEHICLE RESTRAINT DEVICE
William J. Sobkow, Dearborn Heights, Mich., assignor to
Ford Motor Company, Dearborn, Mich.
Filed Jan. 15, 1971, Ser. No. 106,756
Int. Cl. B60r 21/10
U.S. Cl. 280—150 AB                    2 Claims

ABSTRACT OF THE DISCLOSURE

A motor vehicle restraint device for use in absorbing energy from a passenger during vehicle decelerations of either moderate or excessive amounts is described. The restraint device includes a static or fixed restraint structure normally positioned generally forward of a seated passenger. This static structure is movable with respect to the vehicle structure in a direction generally upward from its normal position. During moderate vehicle decelerations, the vehicle passenger may engage the structure and the structure will absorb energy by deformation. A dynamic air bag is mounted below the static restraint structure. During a vehicle deceleration of an excessive amount, the air bag is inflated to contact the lower portions of the body of the passenger. Inflation of the air bag also causes the static restraint structure to be moved upwardly to a location in the general path of travel of the upper portion of the body of the passenger.

BACKGROUND OF THE INVENTION

Known prior art restraint devices for use in motor vehicles include dynamic air bag systems. A dynamic air bag system is one in which an inflatable bag is stored in an uninflated condition in a housing attached to body structure of the vehicle. In general, the bag is stored in a position generally forward of a seated vehicle passenger. During a rapid vehicle deceleration, a gas generating device coupled to the interior of the bag is actuated to supply gas to the bag. The gas flowing into the bag causes it to inflate at a rapid rate.

Generally the housing which retains the bag is so formed, that upon inflation of the bag, the housing ruptures to permit deployment of the bag in front of the passenger. The inflated bag functions to absorb energy from the passenger when he engages the same. The passenger is thereby restrained within the interior of the motor vehicle.

Also known in the prior art are static energy absorbing panels for forming decorative portions of the vehicle interior. More particularly, many areas of the interior structure of the vehicle are formed from padded, deformable panels which may be engaged by passenger during moderate vehicle decelerations. These panels generally absorb energy from the passenger during such engagements. Such deformable panels can be formed from a substantially closed, gas impervious structure having the interior volume thereof filled with a foam material. Such a foam filled structure is used because this type of structure is generally resilient and will return to its initial shape after being deformed.

Various portions of the human body can absorb force at different levels without doing damage or causing injury. For example, the knees and legs of the human body may absorb a much higher force load than the head and upper torso of the body. With this in mind, a dynamic air bag system must be so designed that it does not provide excessive impact force loads on the various portions of the body which cannot withstand the same. Similarly, the static or deformable energy absorbing structures of a motor vehicle must also be designed so that they do not apply a large force load to the portions of the body which cannot withstand the same. With respect to the dynamic air bag systems, in order to reduce the impact loads on various portions of the body, it is necessary to inflate the air bag at a controlled rate to a low level of overall pressure. Such inflation is accomplished by means of gas generator systems which are costly.

SUMMARY OF THE INVENTION

This invention relates to a restraint device for use in a motor vehicle and, more particularly, to a restraint device for a motor vehicle which employs both static and dynamic systems. The static and dynamic systems are so constructed that during a vehicle deceleration of a moderate amount, only the static system is employed for restraining a vehicle passenger. During a vehicle deceleration of a moderate amount, only the static system is employed for restraining a vehicle passenger. During a vehicle deceleration of an excessive amount, both the static and the dynamic systems of the restraint device are utilized. The static system of the restraint device is utilized in conjunction with portions of the passenger's body which can withstand relatively small impact loads. The dynamic system of the restraint device is employed in conjunction with portions of the passenger's body which can withstand relatively high impact loads.

In accordance with the teachings of the invention, a restraint device is provided for inclusion in a motor vehicle having both body structure defining a passenger compartment and a forward facing passenger seat located within the compartment. The device is adapted to restrain movement of a passenger during vehicle decelerations of either moderate or excessive amounts. The device includes the following structure. A deformable, energy absorbing structure of sufficient size to absorb energy from portions of the passenger brought into contact therewith during vehicle decelerations is secured to the vehicle body structure generally forward of the torso of a seated passenger. The deformable energy absorbing structure is movably secured to the vehicle body structure in such a manner that it is pivotal upward with respect to the body structure from its normal position. A dynamic, inflatable air bag capable of absorbing energy from the passenger when in an inflated condition is mounted, in an uninflated condition, at a position both below the energy absorbing structure and adjacent the knees of the seated passenger. A gas generating device is provided for cooperation with the interior of the air bag for inflating the air bag during excessive vehicle decelerations. When an excessive vehicle deceleration takes place, the air bag is inflated both to engage and absorb energy from the impacting thereof by the knees of the passenger and to pivot the energy absorbing structure upwardly with respect to the body structure of the vehicle so that the head of the seated passenger may impact the same. The joint use of the static and dynamic systems in a single restraint device provides the dynamic system closely adjacent the portions of the human body which withstand higher impact loads and provides the energy absorbing structure adjacent the portions of the body which can withstand a lower impact load.

In greater detail, the restraint device may include for the static system a substantially closed, gas impervious structure filled with a porous foam material designed so that it will provide low impact loads when impacted by portions of the body of the vehicle passenger. Also in greater detail, the dynamic system may include an inflatable air bag of high pressure design which can be inflated by a simple, low cost inflating device.

BRIEF DESCRIPTION OF THE DRAWINGS

FIG. 1 is a side elevation view, with parts broken away and parts in section, of a motor vehicle passenger compartment including a restraint device according to this invention.

FIG. 2 is a view of the passenger compartment of FIG. 1 illustrating the restraint device of this invention in a deployed position as would occur during an excessive vehicle deceleration.

FIG. 3 is a plan view of a portion of the vehicle passenger compartment showing a location site for the restraint device.

DESCRIPTION OF THE PREFERRED EMBODIMENT

Construction

Referring now in detail to the drawings, and in particular to FIGS. 1 and 2, the numeral 10 denotes generally a motor vehicle having a body structure including a roof 12, a floor 14 and a windshield 16 cooperating to define a passenger compartment 18. A forward facing passenger seat 20 is secured to the floor within the compartment. A passenger 22 is illustrated as supported on the seat.

A restraint device, formed according to the teachings of this invention and generally designated by the numeral 24, is positioned just forward of the seated passenger 22. In FIG. 1, the restraint device is shown in a normal condition. In FIG. 2, the restraint device is illustrated in a condition which it achieves upon the occurrence of a rapid vehicle deceleration.

The restraint device 24, in the embodiment shown in FIGS. 1 and 2, includes a deformable, energy absorbing structure 26. A pivotable hinge 28 mounts the energy absorbing structure to body structure 30 of the motor vehicle 10. The hinge permits the energy absorbing structure 26 to be pivoted upwardly from its normal position as illustrated in FIG. 1.

The energy absorbing structure 26 has an outer, flexible skin 32 constructed of material that is impervious to gas. This skin is usually formed of material which will not support its own weight. Shape and form is given to the energy absorbing structure by a foam 34 that is confined by the outer skin. This foam is of an open cell type and is resiliently deformable. A satisfactory foam has been found to be urethane foam having a porosity of approximately 90 percent.

The energy absorbing structure 26 is normally inflated at atmospheric pressure. An opening from the interior of the structure 26 to the atmosphere is provided by a restricted orifice 36 in the outer skin. The energy absorbing structure is so designed that it absorbs energy from the contact thereby of portions of the body of the vehicle passenger 22. When a passenger engages the structure, the volume of the interior of the structure is reduced and the pressure therein increased. When the pressure is increased, the air trapped within the structure is bled slowly through the orifice 36. Initial contact of the bag deforms the skin 32 thereof and compresses the air normally confined within the bag. The volume of the bag is so designed that a force load against the engaging part of the passenger's body is controlled to a level which the engaging portions of the body can tolerate. As best seen in FIG. 3, the energy absorbing structure has a width dimension generally wider than the torso of the passenger. The energy absorbing structure 26 forms the static restraint portion of the device of this invention.

As best seen in FIGS. 1 and 2, a dynamic air bag 38 is positioned below the energy absorbing structure 26. The dynamic air bag 38 is illustrated in its uninflated condition in FIG. 1 and an inflated condition in FIG. 2. The dynamic air bag is held in its position below the energy absorbing structure by means of support structure 40.

A gas generator 42, of known construction, is shown as being enclosed and supported by structure 40 within the closed volume of the air bag 38. The gas generator is connected to suitable sensing mechanism for detecting a rapid deceleration of the vehicle 10. When such a rapid deceleration of the vehicle is detected, the gas generator is actuated and gas is generated thereby within the interior of the bag 38 to inflate the same. Since the air bag 38 is located adjacent the knees 44 of the seated passenger 22, the air bag may be of a high pressure type. More particularly, the air bag may be of the type which is inflated to an interior pressure in excess of 10 pounds per square inch. Since the air bag may be of the high pressure type, the gas generator 42 may take the form of a low cost, pyrotechnic gas generator. Also because of the smaller size, the actuation of the gas generator produces a lower noise level within the passenger compartment during air bag inflation. The bag 38 has a small orifice 46 therein to permit the structure to absorb energy when engaged by the passenger 22.

Operation

The restraint device 24 of this invention is effective during vehicle decelerations of moderate amounts in the following manner. During such moderate vehicle decelerations, the passenger 22 sitting upon the vehicle passenger seat 20 generally is moved forward within the vehicle 10 as by sliding along the lower portion of the seat. With such a sliding motion, the torso and the portion of the knees of the passenger are brought into engagement with the static system of the restraint device 24. Upon this engagement, the outer skin 32 of the energy absorbing structure 26 is deformed and the pressure within the structure is increased. The pressure increase causes a resistant force and permits high pressure air to escape through the orifice 36 to absorb the energy from the engaging portions of the vehicle passenger. The passenger is thereby restrained by this static restrain system. The chance of injury to the passenger during the deceleration is thus reduced.

During a severe deceleration of the vehicle 10, the passenger 22 seated upon the passenger seat 20 has a tendency to move forward of the body structure by sliding until some portion of the body is restrained and then by a pivotable action. More particularly, the head and upper body portions of the passenger pivot and are moved forward as illustrated in FIG. 2 once some portion of the lower body is restrained. In the case of a severe deceleration, a sensing device (not shown) of the air bag 38 senses the rapid deceleration of the vehicle and actuates the gas generator 42. Upon actuation, the gas generator develops a supply of gas in a rapid time interval. The gas so generated is substantially confined within the interior of the air bag 38 to inflate the air bag as is illustrated in FIG. 2.

Upon inflation of the air bag 38, the energy absorbing structure 26 of the restraint device 24 is pivoted upward about the pivotable hinge 28. The upward pivot of the energy absorbing structure 26 occurs because the material of the air bag 38 expands between the knees 44 of the passenger 22 and the energy absorbing structure. The upward pivoting of the energy absorbing structure repositions this structure in the line of travel of the seated passenger. Thus upon actuation of the air bag 38, the energy absorbing structure 26 is repositioned so that it may be engaged by the head and upper torso portions of the seated passenger 22 so that energy may be absorbed from these portions of the passenger. If the energy absorbing structure is sufficiently deformable, the pivotable hinge 28 is not needed as the action of the inflated air bag alone will reposition the structure.

With the utiliztzation of the restrain device 24 of this invention, the better features of both the static and the dynamic types of restraint systems may be employed. More particularly, the dynamic air bag 38 of a high pressure type may be employed adjacent the knees of the vehicle passenger as this portion of the body of the vehicle passenger may take a much higher impact load. The energy absorbing structure 26 which applies a low impact load to the body of the passenger may be positioned adjacent portions of the body structure of the passenger which can tolerate only low impact loads. Also, because the dynamic air bag may be small and of high pressure construction, a low cost gas generator may be utilized in conjunction therewith.

There has been described herein a restraint device for utilization in a motor vehicle structure. The restraint device of this invention employs both static and dynamic restraint systems. In moderate vehicle decelerations, the static restraint system is the operative restraint system. In excessive vehicle decelerations, both the static and the dynamic restraint systems are active in restraining the vehicle passenger. Many modifications of the vehicle restraint structure will be apparent to those skilled in the art in view of the teachings of this specification. All such modifications are within the scope of the invention.

I claim:

1. A restraint device for inclusion in a motor vehicle having body structure defining a passenger compartment and a forward facing passenger seat located within said compartment, said device adapted to restrain movement of a passenger during vehicle decelerations of either moderate or excessive amounts, which device comprises: first energy absorbing means including a porous foam structure for absorbing energy when impacted by said passenger during a deceleration of the vehicle of a moderate amount; a hinge structure formed along the rear top portion of said first energy absorbing means and pivotably mounting said first energy absorbing means on a portion of said motor vehicle body structure generally forward of the torso of said seated passenger; an inflatable air bag means for absorbing energy when impacted by said passenger during a vehicle deceleration of an excessive amount; means for mounting said inflatable air bag means to said body structure in an uninflated condition at a position both below said first energy absorbing means and generally adjacent the knees of said seated passenger; and means for inflating said inflatable air bag means during rapid decelerations of said vehicle whereby said air bag is inflated both to engage and absorb energy from the impacting thereof by the knees of said passenger and to pivot said first energy absorbing means upwardly about said hinge structure with respect to said body structure so that the head of said passenger may impact the same thereby to aid in restraining said passenger within said vehicle during rapid vehicle decelerations.

2. A restraint device for inclusion in a motor vehicle having body structure defining a passenger compartment and a forwardly facing passenger seat located within said compartment, said device adapted to restrain movement of a passenger during vehicle decelerations of either moderate or excessive amounts, which device comprises: a resiliently deformable, energy absorbing structure having a width dimension generally wider than the torso of a passenger and of sufficient size to absorb energy from portions of said passenger brought into contact therewith during vehicle decelerations; a hinge structure formed along the rear top portion of said energy absorbing structure and mounting said energy absorbing structure to said body structure at a normal position generally forward of the torso of said seated passenger, said energy absorbing structure being pivotable about said hinge structure from its normal position generally upward with respect to said body structure; a high pressure, inflatable air bag capable of absorbing energy when in an inflated condition, said air bag in an uninflated condition being secured adjacent a lower portion of said energy absorbing means adjacent the knees of said seated passenger; and a gas generator internal of said high pressure air bag, said generator upon activation during a vehicle deceleration of excessive amount inflating said bag so that said bag is brought into contact with the knees of said passenger and so that said bag during its inflation causes said energy absorbing means to be pivoted about said hinge structure to a position whereat the head of said pasenger may engage the same thereby permitting the device to absorb energy from different parts of the body of the vehicle passenger to aid in restraining said passenger within said vehicle during rapid vehicle decelerations.

References Cited
UNITED STATES PATENTS

| | | | |
|---|---|---|---|
| 3,414,292 | 12/1968 | Oldberg et al. | 280—150 AB |
| 2,070,760 | 2/1937 | Straith | 280—150 B |
| 2,853,339 | 9/1958 | Lazarus | 280—150 B |
| 2,822,187 | 2/1958 | Bibbs | 280—150 BX |
| 3,042,137 | 7/1962 | Mathues et al. | 280—150 BX |
| 2,834,606 | 5/1958 | Bertrand | 280—150 AB |
| 3,610,657 | 10/1971 | Cole | 280—150 AB |

KENNETH H. BETTS, Primary Examiner

U.S. Cl. X.R.

180—90